Aug. 1, 1961  K. NEÜMANN  2,994,132
FREEZE DRYING APPARATUS
Filed Aug. 20, 1957  2 Sheets-Sheet 1
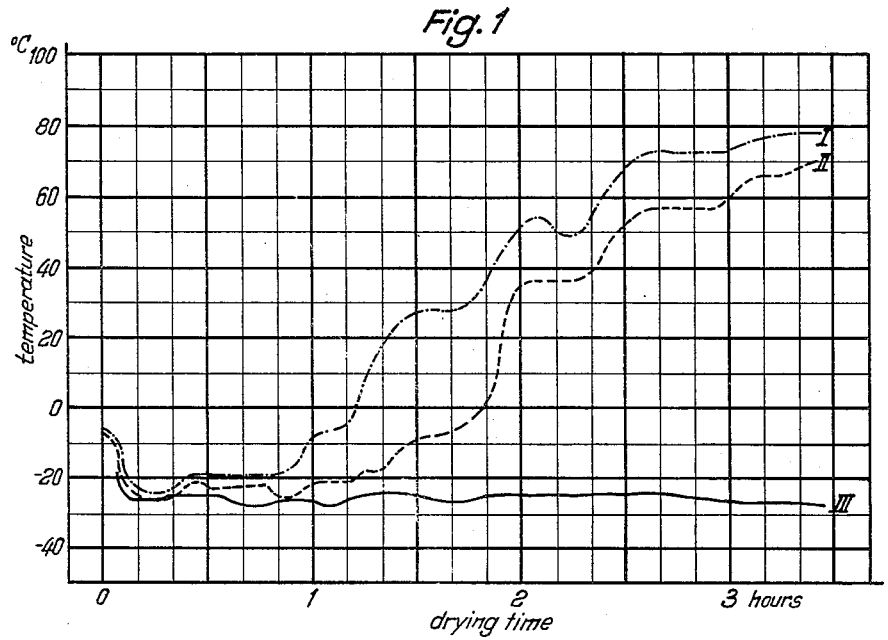
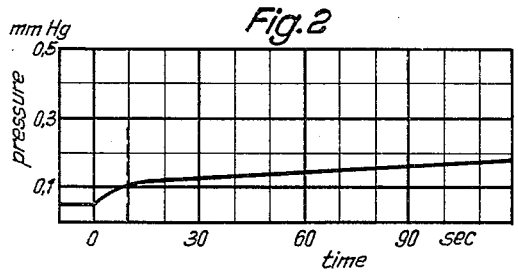
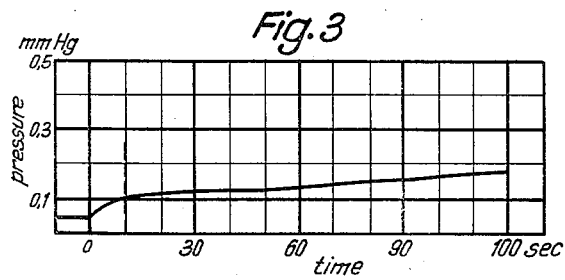
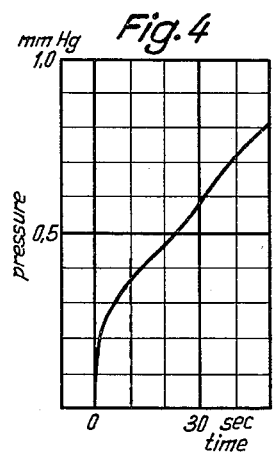
Inventor:
Karlheinz Neümann
By *Fri. D. Frenkel*
Patent Agent

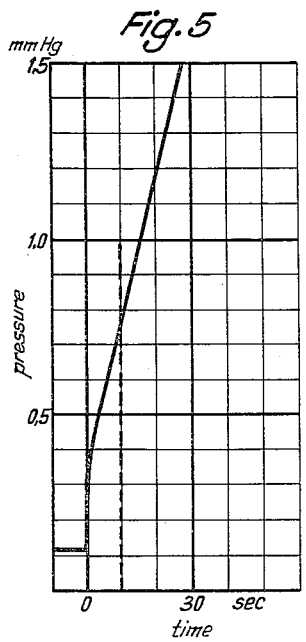
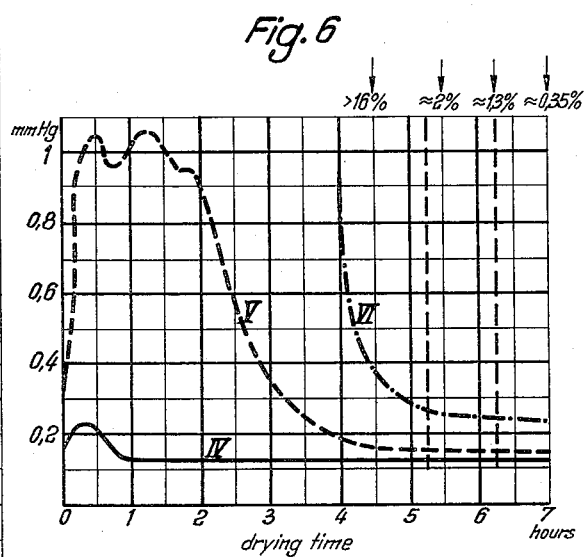
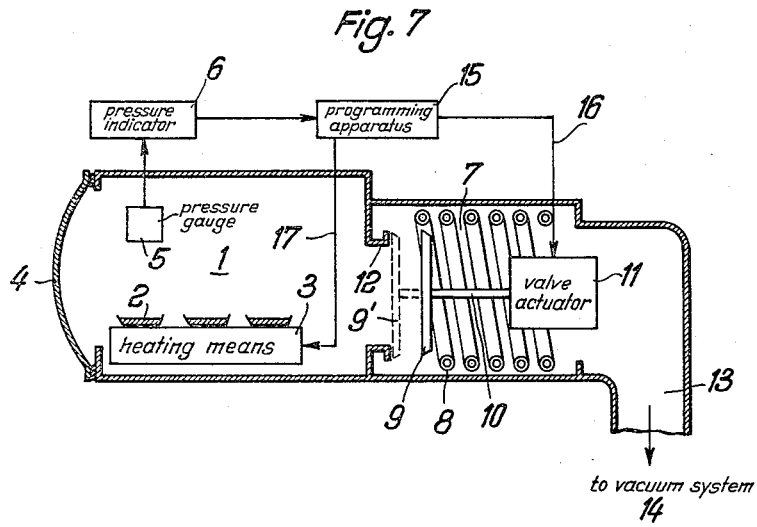

United States Patent Office 2,994,132
Patented Aug. 1, 1961

2,994,132
FREEZE DRYING APPARATUS
Karlheinz Neümann, Bonner Strasse 498a,
Koln-Bayental, Germany
Filed Aug. 20, 1957, Ser. No. 679,180
Claims priority, application Germany Aug. 22, 1956
5 Claims. (Cl. 34—5)

The present invention relates, in general, to freeze drying and, more particularly, to an improved means for determining the temperature of the ice that is enclosed within the material being dried.

In the known freeze drying method, the material which is to be dried is first frozen and then placed inside a vacuum chamber which communicates with means for removing the sublimated water-vapour, which means preferably takes the form of a deep-cooled ice condenser. The necessary vacuum is continually maintained during the drying-process by means of a vacuum pump simultaneously connected to the chamber.

The actual drying-operation is carried out in two stages. To begin with, the ice which has formed within the material to be dried is sublimated away, whereby an already dry outer zone which increases in thickness as the drying proceeds surrounds a progressively shrinking core of ice within the material. Said ice core grows smaller and smaller as the drying proceeds, until the ice is completely sublimated away. At this instant, the so-called rough-drying stage is complete; the so-called fine-drying stage which commences immediately thereafter serves to remove the water bound by absorption in order to give the desired residual moisture content. The latter will depend essentially on the desired storage properties of the dried material, and will vary in accordance with the kind of material being dried.

Now, for a freeze drying process to succeed, it is of particular importance that the temperature be kept within certain limits. As long as solid ice is still present in the material being dried, that is during the rough-drying stage, the temperature in the parts of the material enclosed within the ice should not exceed a certain value which, in most cases, lies far below 0° C. If this occurs, however, e.g. as a result of faulty handling of the apparatus or, especially, of ignorance with regard to the actual temperature within the zone of the material still containing ice the biological characteristics of the material are destroyed.

The temperatures which are permissible within the material containing ice during the rough-drying stage vary within a very wide range according to the type of material being dried. Thus, the maximum tolerable temperature is −7° C. for chicken flesh, −18° C. for cultures of Staphylococcus, while certain fruit-juices and virus cultures can be dried only at temperatures below −25 to −30° C. without danger of damage to the material.

As already mentioned, the maximum tolerable temperatures, given above, apply only to material still embedded within solid ice during the rough-drying stage. Parts of the material from which the ice has already been sublimated away can withstand considerably higher temperatures without suffering damage. Thus, the ferment trombokinase can withstand heating to temperatures above +60° C., when the material is no longer embedded in solid ice, but has a moisture content of less than 4% after termination of the rough-drying stage.

According to the physical laws involved in the drying process the speed and with it the economy of the drying-operation increases with the temperature maintained within the material being dried. In other words, the greater the temperature-dependent difference of vapour-pressure between the material being dried and the surface of the ice condenser can be made, the more rapidly will the drying be completed. Now, if it is desired to obtain as high as possible a difference of pressure between the material and the surface of the ice condenser, the temperature must be maintained at the maximum permissible temperature which the inner core of the material, which is still embedded in ice can withstand without sustaining any damage. This requires an accurate knowledge of the temperature actually within the parts of the material still enclosed by the ice. The already dry outer marginal zones require far less consideration, since the temperatures tolerable in these zones are in any case considerably higher.

However, the methods and means known hitherto for determining the temperature of the parts of the material enclosed within the ice only give results which are extremely unsatisfactory. If the use of resistance- or liquid-thermometers, which are largely unsuitable for the purpose in question be ruled out, the only remaining practical possibility for measuring said temperature is by means of thermocouples which, however, will indicate only very local temperatures, i.e. the temperatures existing at the cold junctions thereof. Now, in a high vacuum, even relatively small or thin interspaces will act as excellent heat insulators so that it is very doubtful whether good thermal contact with the object under investigation can be established. Moreover, if there are a large number of receptacles containing material to be dried, the temperature can be checked only at relatively few test points, and it is to be expected beforehand that the results of the measurements will be rather or even extremely inaccurate owing to poor thermal contact of the thermocouple junction with the material being dried. However, the main reason for the above-noted inadequacy is that, as the rough-drying stage proceeds in the described manner, in which the ice-containing zone gradually retires into the interior of the material being dried, the junction of the thermocouple will emerge from the ice-containing zone at an instant of time which cannot be determined from the outside, and after this instant the junction will be located within the already predried substance. From this moment onwards, present technical means do not permit information to be gained as to the temperature within the zone of the material still containing ice, although it would now be of especial importance to determine the instant at which the last traces of ice are finally sublimated out of the material in order that the fine-drying stage at a higher temperature may be initiated.

The present invention overcomes the indicated difficulties and describes an apparatus which permits the temperature of the ice in a substance being freeze-dried to be measured with accuracy during the drying process.

According to the invention, this is accomplished in a freeze-drying apparatus by successively shutting-off the drying chamber for a short period of less than one minute, preferably for from 2 to 10 seconds, from the means for removing or condensing the water vapor and from the vacuum pump; said shutting-off being so effective that the flow of water vapor to the condensor is largely stopped, or preferably so to an extent of at least 90%; furthermore by measuring the pressure in the drying-chamber by means known per se at the end of the period of shutting-off, this period being extended to at least the end of the non-linear rise in pressure; and finally, by determining the temperature of the ice in the material being dried from the pressure measured at the end of the shutting-off period on the basis of the vapor pressure curve of ice. In the case of the pressure gauge used, there exists the secondary requirement that its time of response must be short compared to the period of shutting-off. An ionization manometer of the type utilising a radioactive exciting substance may be used with advantage as a gauge.

Accordingly, it is a principal object of the present invention to provide an improved freeze-drying apparatus.

Another object is to provide a freeze-drying apparatus in which the temperature of the ice enclosed within the material being dried can be determined rapidly and with accuracy.

Yet another object is to provide a freeze-drying method and apparatus which permit operation at elevated temperatures and with increased additional heating, without damage being caused to delicate materials owing to excessively high temperatures of the parts of the material enclosed within the ice core.

A further object is to provide a freeze-drying apparatus which renders possible a considerably shorter time of drying and thus gives increased efficiency.

Finally, it is an object of the invention to provide an apparatus which permits automatic control of the freeze-drying operation together with optimum speed and hence, optimum economy.

These and other objects will become apparent upon consideration of the following description with reference to the accompanying drawings, wherein:

FIG. 1 is a showing of the temperature in a material being dried as a function of the time of drying.

FIG. 2 is a graph giving the pressure in a closed drying-chamber as a function of time, when milk in open dishes is being used as material being dried.

FIG. 3 is a graph giving the pressure in a closed drying-chamber as a function of time, when milk in small bottles is used as material being dried.

FIG. 4 is a graph giving the pressure in a closed drying-chamber as a function of time, when milk in small bottles is used as the material being dried at a higher temperature of the heating plates.

FIG. 5 is a graph giving the pressure in a closed drying-chamber as a function of time, when milk in small bottles is used as the material being dried at a still higher heating temperature.

FIG. 6 is a graph showing the pressure characteristics in a drying-chamber with closed and opened means for shutting-off; and FIG. 7 is a schematical representation in cross-section of an apparatus used in putting into practice the method of the invention.

With particular reference to the drawings, FIG. 1 shows the temperature of the material being dried, as measured by means of two thermocouples (curves I and II) and, by comparison, as determined in accordance with the procedure of the present invention giving the true temperature (curve III). The graph shows, that at the beginning of the freeze-drying operation, when the thermocouple junctions are still embedded in the ice within the material, there is relatively good agreement between the temperature determination III as carried out by the method of the present invention and the temperature measurement by means of the thermocouples. It will be noted, however, that at some time sooner or later during the course of the rough-drying process, depending on the chance locations of the thermocouple junctions within the frozen material, the thermocouple measurements begin to deviate considerably from the actual values of the temperatures inside the ice within the material. For example, after a drying time of two hours the thermocouple II indicates a temperature of +35° C., whereas the actual temperature of the parts enclosed within the ice is −25° C. Thus, if the indication provided by the thermocouples is relied upon, the termination of the freeze-drying process will be delayed in uneconomical manner.

According to the present invention, the temperature determination is based on the consideration that, in a closed drying chamber, the pressure within the chamber first undergoes a non-linear rise which continues until a saturation value is attained, as given by the vapor-pressure characteristic of ice. From this instant, further pressure-rise is approximately linear and is determined only by leakages, if any, in the apparatus, as well as by the temperature-rise within the material being dried which is caused in the absence of cooling by evaporation, by the action of the heating elements. In FIGS. 2 to 5, the non-linear and the subsequent linear, pressure-rise is shown; the experiments being carried out using milk in different receptacles as material being dried, and with a varying supply of heat. In the case of FIGS. 2 and 3, the milk to be dried is placed within the chamber in open dishes and in small bottles respectively, the heating plate temperature being 0° C. for both. In the case of FIG. 4, the material being dried is contained in small bottles placed on a heating plate which has been heated to 50° C. For FIG. 5 the same conditions obtain as for FIG. 4, except that the temperature of the heating plate is +80° C. In all figures, each time interval of 10 seconds is indicated by broken lines running parallel to the ordinate. As these graphs show, the range of linear pressure-rise is reached in all cases after a period of 5 or 10 seconds. In all of these cases it will therefore be sufficient to allow a shutting-off period of 5 or 10 seconds. A considerable extension of the shutting-off period during the rough-drying stage would not be suitable, since such extension would cause a considerable increase of the temperature within the ice-containing material, and might result in destruction of the substances. A particular advantage of the method given by the invention is that the result of measurement covers the temperature of all bottles or dishes filled with material being dried, and it should be particularly noted that the result of measurement is determined by the warmest points within the ice-containing material, since during the short shutting-off period practically no resublimation from the warmer to the colder localities takes place and, hence, no state of equilibrium can be established.

The additional pressure rise within the drying-chamber during the shutting-off period due to leakages in the apparatus, and the equidirectional temperature rise due to heating of the material being dried, constitute errors which may have to be corrected for in the usual manner when determining the actual temperature.

The method of operating the apparatus provided by the invention may be modified so as to permit exact determination of the instant of time at which the rough-drying stage has been completed. For this purpose it is necessary also to make a measurement, in conventional manner and in addition to the measurement of pressure in the drying-chamber at the end of the shutting-off period of the absolute pressure when the water-vapor separator is connected. Towards the end of the rough-drying operation the course of pressure values at the end of the shutting-off period taken as a function of the drying time runs, approximately parallel to that of the absolute values of the pressure when the shut-off member is open as will be seen from FIG. 6.

Moreover, in accordance with the invention, the shutting-off period is to be increased e.g. to 2 minutes, as from the instant at which the course of pressure values at the end of the shutting-off period (i.e. after 5 or 10 seconds, for example) almost begins to parallel that of the operating-pressure values when the shut-off member or valve is open. Now, if the difference between the pressure in the drying-chamber at the end of the shutting-off period, and the absolute pressure, when the water separator is connected is still approximately constant even after the increased shutting-off period of about 2 minutes, then it may safely be assumed, as has also been shown and proved by practical tests, that the solid ice has been completely removed from the material being dried, which means that the rough-drying stage is complete. The constant difference between the pressure in the drying-chamber at the end of the shutting-off period and the absolute pressure when the water separator is connected corresponds to the parallel course of both two curves and indicates the fact that from now on the adsorptively bound water will determine the further course of the drying and that, regarding the heating of the material being dried, any precaution necessitated by the presence of ice within the material being dried can be omitted. In FIG. 6, the residual-moisture values to which further drying leads are indicated by broken lines running parallel to the ordinate.

The present invention also provides an apparatus which is especially well suited putting into practice the above-described method. The essential features of the apparatus consist in the drying-chamber being provided with a rapidly closing shut-off member which closes or seals the chamber so tightly that flow of the water vapor to the water separator (ice condenser) is largely stopped preferably to an extent of at least 90%, and in the pressure chamber being equipped with a pressure gauge which permits measurement of both the total pressure and the pressure rise, when the shut-off member is closed, with a short time of response.

The improved apparatus is schematically represented in FIG. 7. Within the vacuum chamber 1 there is contained the material 2 to be dried to which heat from a means of heating 3 can be supplied. The means of heating 3 may be of any suitable form, such as an electrical resistance heater or a device which is operated by a circulating heating fluid. The material to be dried may be introduced into the vacuum chamber 1 through an opening which can be closed by a cover 4. Within the vacuum chamber 1 there is also provided a pressure gauge 5 of the type heaving a short time of response which is connected to a suitable pressure indicator and to a means of power supply 6. A chamber 7 adjoining the vacuum chamber 1 contains an ice condenser which may, for example, be in the form of a cooling coil 8. In accordance with the invention, chamber 1 and chamber 7 may be separated from each other by a rapidly closing valve. The valve is shown, for example, as comprising a valve disk 9 which can be shifted by a rod 10 by means of an electromagnetically, hydraulically, pneumatically or otherwise operated actuator 11 of known type. In the closed state (as indicated by broken lines), the disk 9' bears against the valve seat 12. Chamber 7 is connected through a pipe 13 with a vacuum system 14 of known type, which may include suitable valve means, pumps etc.

With the novel method of determining the temperature in the ice disclosed in the foregoing, it is now possible to construct a freeze drying apparatus for largely automatic performance of the process steps. It is possible to control the supply of heat to the material being dried in an optimum manner, and to this end the pressure existing within the drying-chamber at the end of the shutting-off period is used to regulate, by known per se means the electrical heating by way of example. Apart from the heating, certain cooling processes may be controlled too.

Since the time of completion of the rough-drying can now be determined properly, it is also possible to initiate automatically the transition to the fine-drying stage, for which purpose the constant pressure difference occurring at this time effect the switching-over of the system.

The automatic actuation of the apparatus and control of the drying procedure described above may be effected by means of a programming apparatus 15 which receives the measured data from the pressure indicator 6 and causes actuation of the valve 9, 10, 11, the controls of the heating etc., is indicated schematically by the arrows 16 and 17. Devices of this kind are known per se and therefore need not be described in detail.

The momentary saturation vapor pressure existing in the drying-chamber after a shutting-off period of constant duration can also be used for determining the residual moisture content in the material being dried. This merely requires a knowledge of the desorption isotherms of the material being dried.

The novel apparatus constitutes marked advance inasmuch as the use thereof makes it possible to dry a material under optimum conditions of heat supply with the highest possible speed, and at the same time to ensure that the substance being dried is protected against excessive heating.

Having now particularly described and ascertained the nature of my said invention and in what manner the same is to be practised, I declare that what I claim is:

1. In a freeze-drying apparatus for use in removing admixed ice and absorbed ice from materials by sublimation and evaporation respectively, a drying chamber wherein said materials to be freeze-dried are placed, a condensing chamber communicating with said drying chamber and having means for condensing water vapor withdrawn from said drying chamber, valve means for sealing said chambers from each other, said valve means being normally open during freeze-drying operation, evacuating means communicating with said condensing chamber for evacuating said drying chamber when said valve means are open, whereby said ice is vaporized and withdrawn from said drying chamber and brought into contact with said condensing means, valve actuator means for repeatedly closing said valve means for preselected intervals of time, and means for measuring the difference betwen the pressure of water vapor being evacuated and the saturation pressure of said water vapor during said preselected intervals of time to establish the presence of admixed ice in said materials.

2. In a freeze-drying apparatus for use in removing admixed ice and absorbed ice from materials, a drying chamber wherein said materials to be freeze-dried are placed, means for evacuating said drying chamber whereby said ice is vaporized and withdrawn from said drying chamber, valve means for sealing said drying chamber from said evacuating means, said valve means being normally open during freeze-drying operation, valve actuator means for repeatedly closing said valve means for preselected intervals of time, and means for measuring the difference between the pressure of said vaporized ice being evacuated and the saturation pressure of said vaporized ice during said time intervals to establish the presence of admixed ice in said materials.

3. In the apparatus defined in claim 2 wherein a heating means is provided in said drying chamber to selectively heat said materials, means for automatically controlling said heating means, wherein said measuring means comprises means for establishing a signal when said pressure difference is reduced to a continuing minimum, and means for communicating said signal to said controlling means to activate said heating means whereby said materials are heated to a predetermined temperature to drive off said absorbed ice in said material.

4. In the apparatus defined in claim 2, wherein said valve means is disposed in a passage communicating with evacuating means and said drying chamber, and wherein means are provided in said passage for condensing said water vapor being evacuated.

5. In the apparatus defined in claim 4, wherein said condensing means comprises an evaporator coil concentric with said valve means.

References Cited in the file of this patent

UNITED STATES PATENTS

| | | |
|---|---|---|
| 2,346,101 | Bright | Apr. 4, 1944 |
| 2,388,134 | Flosdorf et al. | Oct. 30, 1945 |
| 2,515,098 | Smith | July 11, 1950 |
| 2,731,734 | Bancroft | Jan. 24, 1956 |

UNITED STATES PATENT OFFICE
CERTIFICATION OF CORRECTION

Patent No. 2,994,132                                  August 1, 1961

Karlheinz Neumann

It is hereby certified that error appears in the above numbered patent requiring correction and that the said Letters Patent should read as corrected below.

In the grant, lines 1 to 3, for "Karlheinz Neümann, of Koln-Bayental, Germany," read -- Karlheinz Neumann, of Köln-Bayental, Germany, --; line 12, for "Karlheinz Neümann, his heirs" read -- Karlheinz Neumann, his heirs --; in the heading to the drawings, Sheets 1 and 2, line 1, for "K. NEÜMANN", each occurrence, read -- K. NEUMANN --; lower right-hand corner of each sheet of drawings, for "Karlheinz Neümann", each occurrence, read -- Karlheinz Neumann --; in the heading to the printed specification, lines 3 and 4, for "Karlheinz Neümann, Bonner Strasse 498a, Koln-Bayental, Germany" read -- Karlheinz Neumann, Bonner Strasse 498a, Köln-Bayental, Germany --.

Signed and sealed this 2nd day of October 1962.

(SEAL)
Attest:

ERNEST W. SWIDER                                          DAVID L. LADD
Attesting Officer                                            Commissioner of Patents